United States Patent
Xu et al.

(10) Patent No.: US 11,181,357 B2
(45) Date of Patent: Nov. 23, 2021

(54) U-SHAPED TOUCH GAUGE

(71) Applicant: CITIC Dicastal CO., LTD, Qinhuangdao (CN)

(72) Inventors: Zuo Xu, Qinhuangdao (CN); Bowen Xue, Qinhuangdao (CN); Xinhan Liu, Qinhuangdao (CN); Jiandong Guo, Qinhuangdao (CN)

(73) Assignee: CITIC DICASTAL CO., LTD, Hebei (CN)

( * ) Notice: Subject to any disclaimer, the term of this patent is extended or adjusted under 35 U.S.C. 154(b) by 351 days.

(21) Appl. No.: 16/404,360

(22) Filed: May 6, 2019

(65) Prior Publication Data
US 2020/0003540 A1    Jan. 2, 2020

(30) Foreign Application Priority Data
Jul. 2, 2018    (CN) .......................... 201810706065.6

(51) Int. Cl.
*G01B 5/00*    (2006.01)
*G01B 5/06*    (2006.01)

(52) U.S. Cl.
CPC .................................. *G01B 5/061* (2013.01)

(58) Field of Classification Search
CPC ......... G01B 5/016; G01B 5/063; G01B 5/065
USPC ........................................................ 33/556
See application file for complete search history.

(56) References Cited

U.S. PATENT DOCUMENTS

| | | | | |
|---|---|---|---|---|
| 4,894,920 A | * | 1/1990 | Butler | G01B 3/22 33/203.11 |
| 6,397,486 B1 | * | 6/2002 | Keys | G01B 5/0002 33/522 |
| 7,841,102 B2 | * | 11/2010 | Xiao | G01B 3/22 33/832 |
| 8,448,346 B2 | * | 5/2013 | Ketelaar | G01B 3/22 33/549 |
| 10,378,999 B2 | * | 8/2019 | Xue | B62D 65/005 |
| 10,823,544 B2 | * | 11/2020 | Xue | G01B 5/061 |
| 10,953,694 B2 | * | 3/2021 | Xue | B60B 3/16 |
| 2020/0003537 A1 | * | 1/2020 | Xue | G01B 3/26 |

FOREIGN PATENT DOCUMENTS

| | | |
|---|---|---|
| CN | 202692909 U | 1/2013 |
| CN | 105890499 A | 8/2016 |

* cited by examiner

*Primary Examiner* — George B Bennett
(74) *Attorney, Agent, or Firm* — Calfee, Halter & Griswold LLP

(57) ABSTRACT

The present application relates to a U-shaped touch gauge, which comprises a base plate, a transfer plate, a floating column, a fixing block, a measuring sleeve, a measuring column and the like. In use, round head of top end of the floating column is in contact with bottom surface of a work piece. The floating column is compressed downward when it contacts high surface of the bottom surface of the work piece, left side of the transfer plate is depressed and then right side thereof is lifted, in the meantime, the right spring is compressed and the measuring column is lifted.

1 Claim, 1 Drawing Sheet

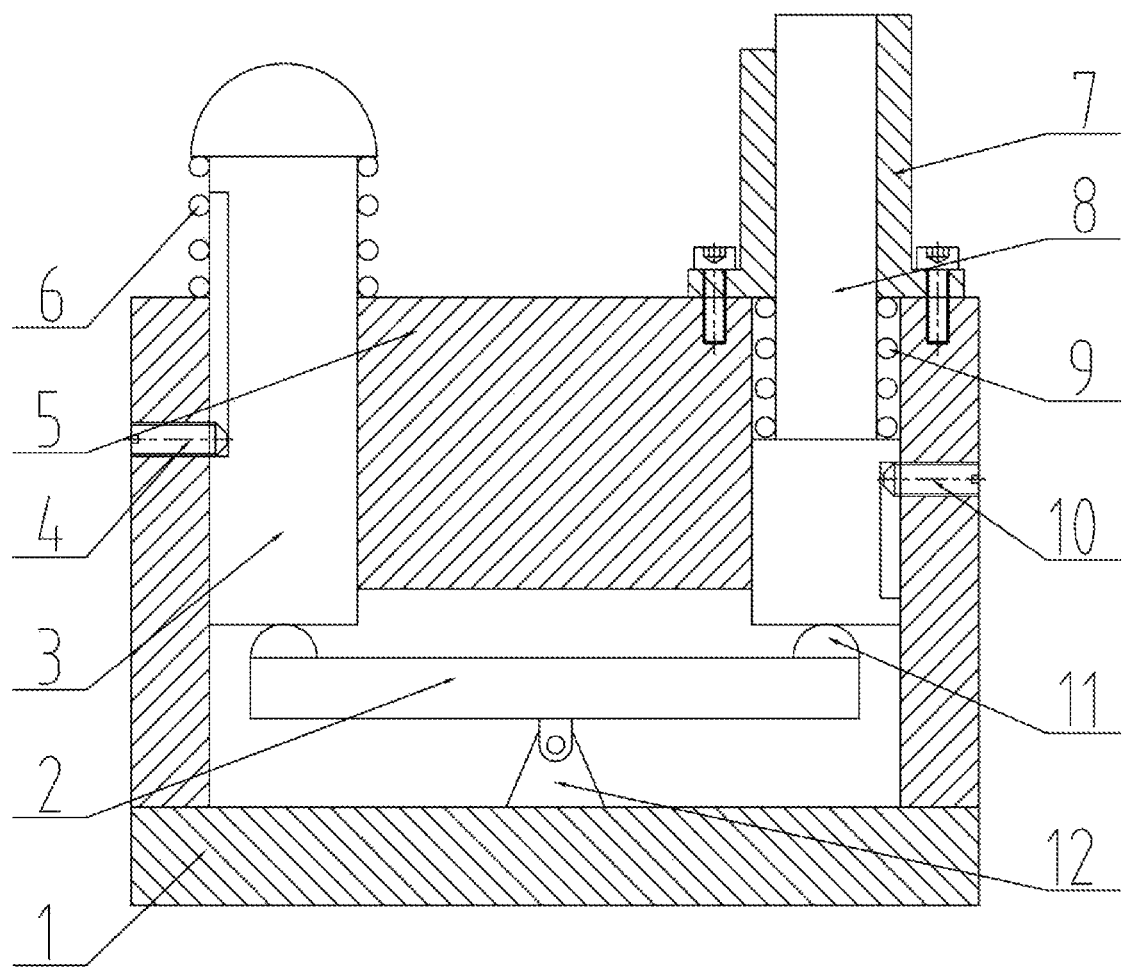

U-SHAPED TOUCH GAUGE

CROSS-REFERENCE TO RELATED APPLICATIONS

This application claims priority to Chinese Patent Application No. 201810706065.6, filed on Jul. 2, 2018, which is hereby incorporated by reference in its entirety.

TECHNICAL FIELD

The present application relates to a touch gauge, and more particularly to a touch gauge which may measure a height difference between a high and a low surfaces on a bottom surface of a work piece.

BACKGROUND ART

In the field of machining automotive parts, on the bottom surface of some large work pieces, it is often required to measure the height difference between the high and low surfaces on the bottom surface. Measurements are usually made by a coordinate measuring machine (CMM), but this measurement is very inefficient and not suitable for mass production.

SUMMARY OF THE INVENTION

It is an object of the present application to provide a U-shaped touch gauge which may measure the height difference between the high and low surfaces on the bottom surface of the work piece.

In order to achieve the above object, the technical solution of the present application is: U-shaped touch gauge includes a base plate, a transfer plate, a floating column, a left screw, a fixing block, a left spring, a measuring sleeve, a measuring column, a right spring, a right screw, a hemisphere, and a bracket. Lower cylinder of the floating column is matched with a left hole in the fixing block. The left screw is fixed to left side of the fixing block, and top end thereof is matched with a slot in the floating column. The left spring is sleeved on outer side of cylinder of the floating column, and is placed above the fixing block. Lower cylinder of the measuring column is matched with a right hole in the fixing block. The right screw is fixed to right side of the fixing block, and top end thereof is matched with a slot in the lower cylinder of the measuring column. The measuring sleeve is fixed to upper right side of the fixing block, and is matched with upper cylinder of the measuring column. The right spring is sleeved on outer side of the upper cylinder of the measuring column, and is placed below the measuring sleeve. Top end of the floating column is a round head and bottom end thereof is flat. Upper and lower ends of the measuring column are all flat, and edge of the upper end thereof is kept at sharp angle. Two ends of upper surface of the transfer plate are fixed with a hemisphere respectively, and top ends of the two hemispheres are in contact with the bottom surface of the floating column and bottom surface of the measuring column respectively. Lower portion of the transfer plate is hinged to upper portion of the base plate through the bracket. Top end of the measuring sleeve is a step with edge of an inner hole remaining at a sharp angle.

During the operation, the round head of the top end of the floating column is in contact with bottom surface of a work piece. The floating column is compressed downward when it contacts high surface of the bottom surface of the work piece, the left side of the transfer plate is depressed and then the right side thereof is lifted, in the meantime, the right spring is compressed and the measuring column is lifted, and it can be found whether the height difference between the high surface and low surface of the bottom surface of the work piece is qualified by observing whether edge of the top end surface of the measuring column is placed between the steps of the end surface of the measuring sleeve.

The application may measure the height difference between the high and low surfaces on the bottom surface of the work piece in use, and has the characteristics of simple structure, convenient use, high measurement efficiency and low production cost. The application may improve measurement efficiency and meet the requirements for process monitoring in mass production.

BRIEF DESCRIPTION OF DRAWINGS

FIG. 1 is a front view of a U-shaped touch gauge of the present application.

In figures: 1—base plate, 2—transfer plate, 3—floating column, 4—left screw, 5—fixing block, 6—left spring, 7—measuring sleeve, 8—measuring column, 9—right spring, 10—right screw, 11—hemisphere, 12—bracket.

DETAILED DESCRIPTION OF THE INVENTION

The details and operation of a specific device according to the present application will be described below with reference to the accompanying drawings.

The device includes a base plate 1, a transfer plate 2, a floating column 3, a left screw 4, a fixing block 5, a left spring 6, a measuring sleeve 7, a measuring column 8, a right spring 9, a right screw 10, a hemisphere 11, and a bracket 12. Lower cylinder of the floating column 3 is matched with a left hole in the fixing block 5. The left screw 4 is fixed to left side of the fixing block 5, and top end thereof is matched with a slot in the floating column 3. The left spring 6 is sleeved on outer side of cylinder of the floating column 3, and is placed above the fixing block 5. Lower cylinder of the measuring column 8 is matched with a right hole in the fixing block 5. The right screw 10 is fixed to right side of the fixing block 5, and top end thereof is matched with a slot in the lower cylinder of the measuring column 8. The measuring sleeve 7 is fixed to upper right side of the fixing block 5, and is matched with upper cylinder of the measuring column 8. The right spring 9 is sleeved on outer side of the upper cylinder of the measuring column 8 and is placed below the measuring sleeve 7. Top end of the floating column 3 is a round head and bottom end thereof is flat. Upper and lower ends of the measuring column 8 are all flat, and edge of the upper end thereof is kept at sharp angle. Two ends of upper surface of the transfer plate 2 are fixed with a hemisphere 11 respectively, and top ends of the two hemispheres 11 are in contact with bottom surface of the floating column 3 and bottom surface of the measuring column 8 respectively. Lower portion of the transfer plate 2 is hinged to upper portion of the base plate 1 through the bracket 12. Top end of the measuring sleeve 7 is a step with edge of an inner hole remaining at a sharp angle.

During the operation, the round head of the top end of the floating column 3 is in contact with bottom surface of a work piece. The floating column 3 is compressed downward when it contacts high surface of the bottom surface of the work piece, the left side of the transfer plate 2 is depressed and then the right side thereof is lifted, in the meantime, the right spring 9 is compressed and the measuring column 8 is lifted, and it can be found whether the height difference between the high surface and low surface of the bottom surface of the work piece is qualified by observing whether edge of the top end surface of the measuring column 8 is placed between the steps of the end surface of the measuring sleeve 7.

The foregoing descriptions of specific exemplary embodiments of the present application have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. U-shaped touch gauge, comprising: a base plate, a transfer plate, a floating column, a left screw, a fixing block, a left spring, a measuring sleeve, a measuring column, a right spring, a right screw, a hemisphere, and a bracket;

lower cylinder of the floating column is matched with a left hole in the fixing block; the left screw is fixed to left side of the fixing block, and top end thereof is matched with a slot in the floating column; the left spring is sleeved on outer side of cylinder of the floating column, and is placed above the fixing block; lower cylinder of the measuring column is matched with a right hole in the fixing block; the right screw is fixed to right side of the fixing block, and top end thereof is matched with a slot in the lower cylinder of the measuring column; the measuring sleeve is fixed to upper right side of the fixing block, and is matched with upper cylinder of the measuring column; the right spring is sleeved on outer side of the upper cylinder of the measuring column and is placed below the measuring sleeve; top end of the floating column is a round head and bottom end thereof is flat; upper and lower ends of the measuring column are all flat, and edge of the upper end thereof is kept at sharp angle; two ends of upper surface of the transfer plate are fixed with a hemisphere respectively, and top ends of the two hemispheres are in contact with bottom surface of the floating column and bottom surface of the measuring column respectively; lower portion of the transfer plate is hinged to upper portion of the base plate through the bracket; top end of the measuring sleeve is a step with edge of an inner hole remaining at a sharp angle.

* * * * *